US012739457B2

(12) United States Patent
Bhandaru et al.

(10) Patent No.: US 12,739,457 B2
(45) Date of Patent: Sep. 15, 2026

(54) SYSTEM AND METHOD FOR GENERATING SCORE FOR ML-MODEL TO OPTIMIZE USER EXPERIENCE

(71) Applicant: Awone Datasciences Private Limited, Hyderabad (IN)

(72) Inventors: Vamsi Mohan Bhandaru, Hyderabad (IN); Sarabjeet Singh Kochar, Asker (NO)

(73) Assignee: Awone Datasciences Private Limited, Hyderabad (IN)

( * ) Notice: Subject to any disclaimer, the term of this patent is extended or adjusted under 35 U.S.C. 154(b) by 46 days.

(21) Appl. No.: 18/814,758

(22) Filed: Aug. 26, 2024

(65) Prior Publication Data

US 2025/0071356 A1 Feb. 27, 2025

(30) Foreign Application Priority Data

Aug. 25, 2023 (IN) ............................ 202341057040

(51) Int. Cl.
*H04N 21/25* (2011.01)
*G06N 20/00* (2019.01)
*H04N 21/258* (2011.01)
*H04N 21/2668* (2011.01)

(52) U.S. Cl.
CPC .......... *H04N 21/251* (2013.01); *G06N 20/00* (2019.01); *H04N 21/25866* (2013.01); *H04N 21/2668* (2013.01)

(58) Field of Classification Search
None
See application file for complete search history.

(56) References Cited

U.S. PATENT DOCUMENTS

2019/0303403 A1* 10/2019 More ................ H04N 21/4402
2022/0398411 A1* 12/2022 Cowen .................... G06F 18/41

* cited by examiner

*Primary Examiner* — Jason K Lin
(74) *Attorney, Agent, or Firm* — Jason C. Cameron

(57) ABSTRACT

A computer-implemented system for generating a score for a machine learning (ML) model to optimize user experience in digital interactive platforms, is disclosed. The computer-implemented system is configured to: (a) select animated media contents and second video contents to be played dynamically corresponding to user actions performed by users, in video contents; (b) obtain feedbacks from user devices of the users on the animated media contents and the second video contents played corresponding to the user actions performed by the users; (c) generate the score for the ML-model based on the feedbacks obtained from the user devices of the users on the animated media contents and the second video contents; and (d) generate second animated media contents and third video contents based on the score generated for the machine learning model, to optimize the user experience in the digital interactive platforms.

10 Claims, 5 Drawing Sheets

GENERATE ONE OR MORE VIDEO CONTENTS ASSOCIATED WITH ONE OR MORE DIGITAL INTERACTIVE PLATFORMS — 402

SELECT AT LEAST ONE OF: ONE OR MORE ANIMATED MEDIA CONTENTS AND SECOND ONE OR MORE VIDEO CONTENTS TO BE PLAYED DYNAMICALLY CORRESPONDING TO ONE OR MORE USER ACTIONS PERFORMED BY ONE OR MORE USERS IN THE ONE OR MORE VIDEO CONTENTS — 404

OBTAIN ONE OR MORE FEEDBACKS FROM ONE OR MORE USER DEVICES OF THE ONE OR MORE USERS ON AT LEAST ONE OF: THE ONE OR MORE ANIMATED MEDIA CONTENTS AND THE SECOND ONE OR MORE VIDEO CONTENTS PLAYED CORRESPONDING TO THE ONE OR MORE USER ACTIONS PERFORMED BY THE ONE OR MORE USERS — 406

FIG. 4
(Contd.,)

GENERATE A SCORE FOR A MACHINE LEARNING MODEL BASED ON THE ONE OR MORE FEEDBACKS OBTAINED FROM THE ONE OR MORE USER DEVICES OF THE ONE OR MORE USERS ON AT LEAST ONE OF: THE ONE OR MORE ANIMATED MEDIA CONTENTS AND THE SECOND ONE OR MORE VIDEO CONTENTS — 408

GENERATE SECOND ONE OR MORE ANIMATED MEDIA CONTENTS AND THIRD ONE OR MORE VIDEO CONTENTS, TO BE PLAYED WITH THE ONE OR MORE VIDEO CONTENTS ASSOCIATED WITH THE ONE OR MORE DIGITAL INTERACTIVE PLATFORMS BASED ON THE SCORE GENERATED FOR THE MACHINE LEARNING MODEL, TO OPTIMIZE A USER EXPERIENCE IN THE ONE OR MORE DIGITAL INTERACTIVE PLATFORMS — 410

FIG. 4

SYSTEM AND METHOD FOR GENERATING SCORE FOR ML-MODEL TO OPTIMIZE USER EXPERIENCE

CROSS-REFERENCE TO RELATED APPLICATION(S)

This application claims the priority to incorporate by reference the entire disclosure of Indian Patent Application number 202341057040, filed on Aug. 25, 2023, and titled SYSTEM AND METHOD FOR GENERATING SCORE FOR ML-MODEL TO OPTIMIZE USER EXPERIENCE".

FIELD OF INVENTION

Embodiments of the present disclosure relate to a user engagement system in digital interactive platforms and more particularly relate to a computer-implemented system and method for generating a score for a machine learning model to optimize a user experience in one or more digital interactive platforms.

BACKGROUND

Sports and iGaming industry has experienced a significant intersection in recent years, with both sectors benefiting from their collaboration. A merging of sports and iGaming has created new opportunities for entertainment, engagement, and revenue generation.

Digital interactive platforms are simulated versions of real sports events that are accessed and bet on through online platforms. These digital interactive platforms simulations use advanced algorithms and graphics to mimic an excitement of live sports. The digital interactive platforms allow fans to experience thrills of sports betting even when there are no real events taking place. The digital interactive platforms with continuous streams create user experience that appeals to iGaming and sports enthusiasts.

There are existing inventions configured to increase user experiences to the fans/users by playing sports related contents in the digital interactive platforms. However, the existing inventions provide only prestored sports related contents, which cause the fans/users bored during playing of the digital interactive platforms. Further, the interest of the fans/users during playing of the digital interactive platforms, may be reduced due to repetition of the sports related contents played during the digital interactive platforms.

Further, none of the existing inventions utilizes one or more machine learning models that helps to entertain the fans/users to increase the interest of the fans/users during playing of the digital interactive platforms.

Therefore, there is a need for an improved system and method for generating a score for a machine learning model to optimize a user experience in one or more digital interactive platforms, to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with one embodiment of the disclosure, a computer-implemented system for generating a score for a machine learning (ML) model to optimize a user experience in one or more digital interactive platforms. The computer-implemented system includes one or more hardware processors and a memory. The memory is coupled to the one or more hardware processors. The memory comprises a set of program instructions in form of a plurality of subsystems, configured to be executed by the one or more hardware processors. The plurality of subsystems comprises a video content generating subsystem, a media content selection subsystem, a feedback obtaining subsystem, a score generation subsystem, and a media content generating subsystem.

The video content generating subsystem is configured to generate one or more video contents associated with the one or more digital interactive platforms.

The media content selection subsystem is configured to select at least one of: one or more animated media contents and second one or more video contents to be played dynamically corresponding to one or more user actions performed by one or more users, in the one or more video contents.

The feedback obtaining subsystem is configured to obtain one or more feedbacks from one or more user devices of the one or more users on at least one of: the one or more animated media contents and the second one or more video contents played corresponding to the one or more user actions performed by the one or more users.

The score generation subsystem configured to generate the score for the machine learning model based on the one or more feedbacks obtained from the one or more user devices of the one or more users on at least one of: the one or more animated media contents and the second one or more video contents. The machine learning model is configured to provide at least one of: the one or more animated media contents and the second one or more video contents to be played corresponding to the one or more user actions performed by the one or more users, in the one or more video contents.

The media content generating subsystem is configured to generate second one or more animated media contents and third one or more video contents, to be played with the one or more video contents associated with the one or more digital interactive platforms based on the score generated for the machine learning model, to optimize the user experience in the one or more digital interactive platforms.

In an embodiment, the machine learning (ML) model is trained by (a) analyzing the score generated for the machine learning model, (b) determining whether the score generated for the machine learning model exceeds a predetermined threshold value, and (c) training the machine learning model to generate the second one or more animated media contents and third one or more video contents, to be played with the one or more video contents associated with the one or more digital interactive platforms, when the score generated for the machine learning model is within the predetermined threshold value. In an embodiment, the score is generated for the machine learning model based on the one or more feedbacks obtained from the one or more user devices of the one or more users on at least one of: the one or more animated media contents and the second one or more video contents.

In another embodiment, the score generated for the machine learning model is within the predetermined threshold value when at least one of: the one or more animated media contents and the second one or more video contents corresponding to the one or more user actions performed by the one or more users, is played repetitively in a predefined time period.

In yet another embodiment, the one or more feedbacks obtained from the one or more user devices of the one or more users comprises at least one of: one or more ratings provided through the one or more user devices, and one or more face expressions provided by the one or more users.

In yet another embodiment, the one or more face expressions are provided by the one or more users through one or more image capturing devices of the one or more user devices.

In one aspect, a computer-implemented method for generating a score for a machine learning model to optimize a user experience in one or more digital interactive platforms, is disclosed.

The computer-implemented method further comprises generating, by one or more hardware processors, one or more video contents associated with the one or more digital interactive platforms.

The computer-implemented method further comprises selecting, by the one or more hardware processors, at least one of: one or more animated media contents and second one or more video contents to be played dynamically corresponding to one or more user actions performed by one or more users, in the one or more video contents.

The computer-implemented method further comprises obtaining, by the one or more hardware processors, one or more feedbacks from one or more user devices of the one or more users on at least one of: the one or more animated media contents and the second one or more video contents played corresponding to the one or more user actions performed by the one or more users.

The computer-implemented method further comprises generating, by the one or more hardware processors, the score for the machine learning model based on the one or more feedbacks obtained from the one or more user devices of the one or more users on at least one of: the one or more animated media contents and the second one or more video contents. The machine learning model is configured to provide at least one of: the one or more animated media contents and the second one or more video contents to be played corresponding to the one or more user actions performed by the one or more users, in the one or more video contents.

The computer-implemented method further comprises generating, by the one or more hardware processors, second one or more animated media contents and third one or more video contents, to be played with the one or more video contents associated with the one or more digital interactive platforms based on the score generated for the machine learning model, to optimize the user experience in the one or more digital interactive platforms To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 4 is a flow chart depicting a computer-implemented method for generating the score for the machine learning model to optimize the user experience in the one or more digital interactive platforms, in accordance with an embodiment of the present disclosure.

Figure 1:
FIG. 1 is a block diagram of a computer-implemented system for generating a score for a machine learning (ML) model to optimize a user experience in the one or more digital interactive platforms, in accordance with an embodiment of the present disclosure.
Figure 1:
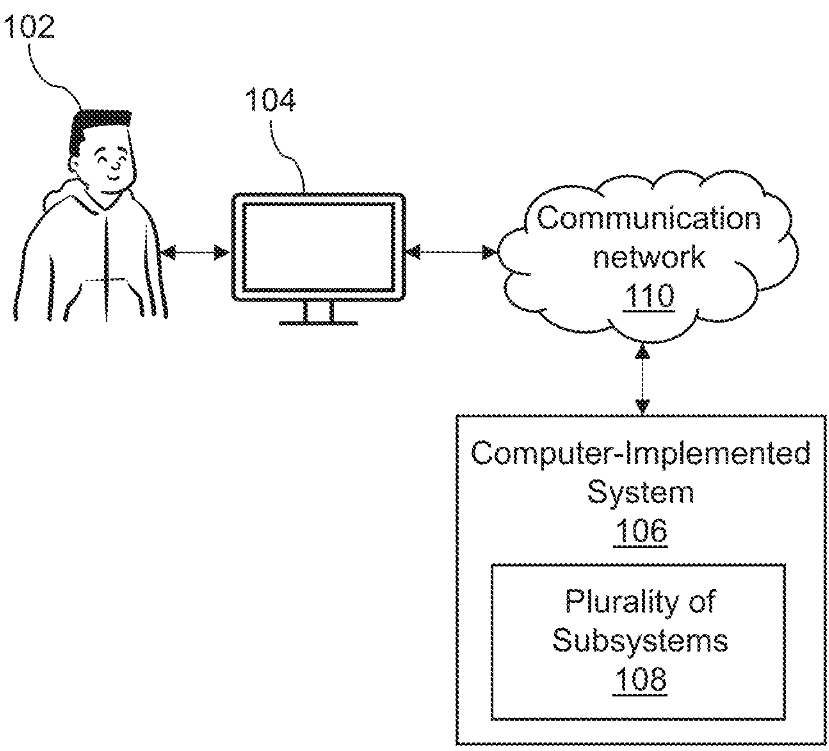

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

FIG. 1 is a block diagram 100 of a computer-implemented system 106 for generating a score for a machine learning (ML) model to optimize a user experience in the one or more digital interactive platforms, in accordance with an embodiment of the present disclosure. The computer-implemented system 106 is configured to optimize the user experience by generating the score (i.e., a reward or a penalty to the machine learning model by providing scores) for the machine learning model based on one or more feedbacks obtained from one or more user devices 104 of the one or more users 102 on at least one of: one or more animated media contents and second one or more video contents.

The computer-implemented system 106 is initially configured to generate one or more video contents associated with the one or more digital interactive platforms. The computer-implemented system 106 is further configured to select at least one of: the one or more animated media contents and the second one or more video contents to be played dynamically corresponding to one or more user actions performed by one or more users 102, in the one or more video contents. In an embodiment, the one or more animated media contents includes one or more video variations to be played with the one or more video contents corresponding to the one or more user actions performed by the one or more users 102.

The computer-implemented system 106 is further configured to obtain one or more feedbacks from the one or more user devices 104 of the one or more users 102 on at least one of: the one or more animated media contents and the second one or more video contents played corresponding to the one or more user actions performed by the one or more users 102.

The computer-implemented system 106 is further configured to generate the score for the machine learning model based on the one or more feedbacks obtained from the one or more user devices 104 of the one or more users 102 on at least one of: the one or more animated media contents and the second one or more video contents. In an embodiment, the machine learning model is configured to provide at least one of: the one or more animated media contents and the second one or more video contents to be played corresponding to the one or more user actions performed by the one or more users 102, in the one or more video contents.

The computer-implemented system 106 is further configured to generate second one or more animated media contents and third one or more video contents, to be played with the one or more video contents associated with the one or more digital interactive platforms based on the score generated for the machine learning model, to optimize the user experience in the one or more digital interactive platforms.

In an embodiment, the computer-implemented system 106 may be hosted on a central server including at least one of: a cloud server, a remote server, and the like. In another embodiment, the computer-implemented system 106 as the central server may generate the score for the machine learning model based on the one or more feedbacks obtained from the one or more user devices 104 of the one or more users 102 on at least one of: the one or more animated media contents and the second one or more video contents.

The computer-implemented system 106 as the central server may further generate the second one or more animated media contents and the third one or more video contents, to be played with the one or more video contents associated with the one or more digital interactive platforms based on the score generated for the machine learning model, to optimize the user experience in the one or more digital interactive platforms, based on above said processes.

In an embodiment, the computer-implemented system 106 may be communicatively connected to the one or more user devices 104 through a communication network 110. The communication network 110 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more user devices 104 may be at least one of: a personal computer, a Smartphone, an electronic notebook, a laptop, and the like.

Figure 2:
FIG. 2 is a detailed view of the computer-implemented system, such as those shown in FIG. 1, in accordance with an embodiment of the present disclosure.
Figure 2:
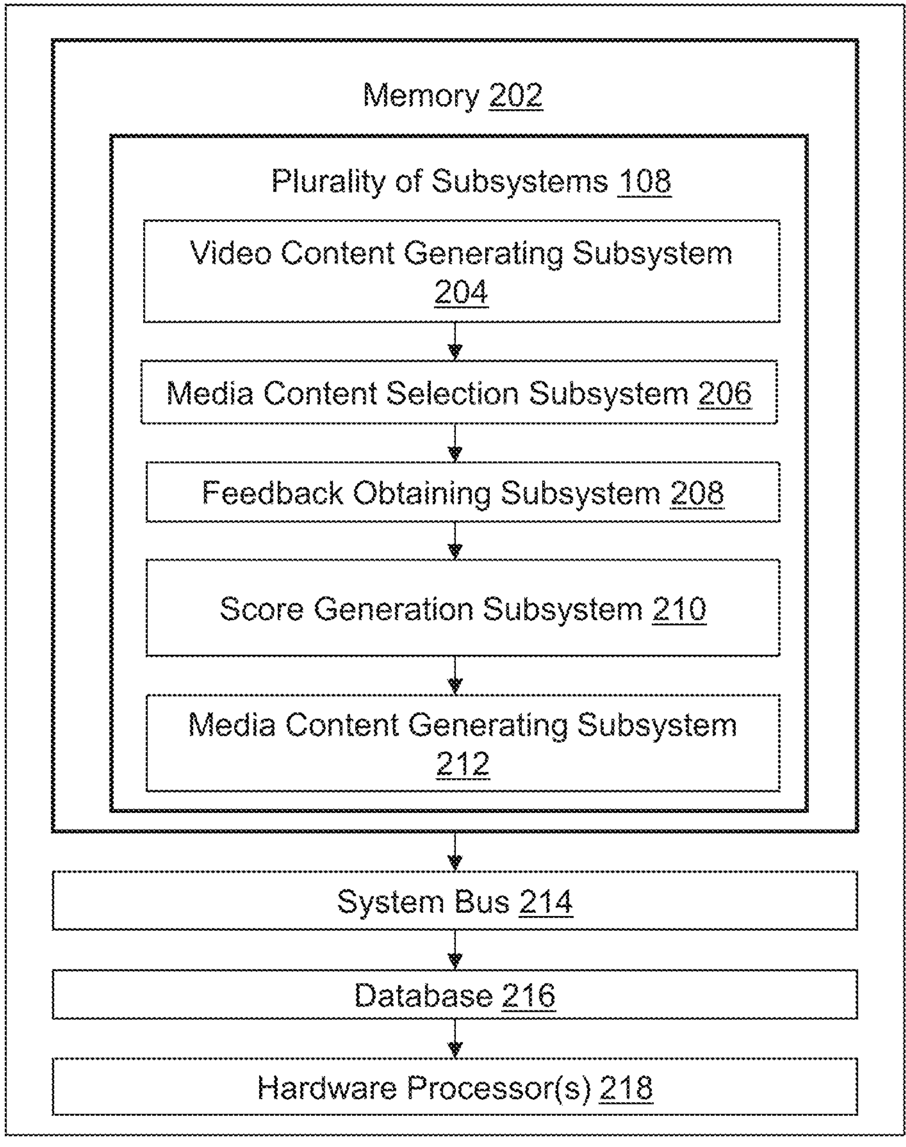

FIG. 2 is a detailed view of the computer-implemented system 106, such as those shown in FIG. 1, in accordance with an embodiment of the present disclosure. The computer-implemented system 106 includes one or more hardware processor(s) 218. The computer-implemented system 106 further includes a memory 202 coupled to the one or more hardware processor(s) 218. The memory 202 includes a set of program instructions in form of the plurality of subsystems 108.

The one or more hardware processor(s) 218, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 202 includes the plurality of subsystems 108 stored in the form of executable program which instructs the one or more hardware processor(s) 218 via a system bus 214 to perform the above-mentioned method steps. The plurality of subsystems 108 includes following subsystems: a video content generating subsystem 204, a media content selection subsystem 206, a feedback obtaining subsystem 208, a score generation subsystem 210, and a media content generation subsystem 212.

Computer memory elements may include any suitable memory device(s) for storing data and executable program, such as read only memory, random access memory, erasable programmable read only memory, electronically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the one or more hardware processor(s) 218.

The plurality of subsystems 108 includes the video content generating subsystem 204 that is communicatively connected to the one or more hardware processor(s) 218. The video content generating subsystem 204 is configured to generate the one or more video contents associated with the one or more digital interactive platforms.

The plurality of subsystems 108 further includes the media content selection subsystem 206 that is communicatively connected to the one or more hardware processor(s) 218. The media content selection subsystem 206 is configured to select at least one of: the one or more animated media contents (i.e., first one or more animated media contents) and the second one or more video contents to be played dynamically corresponding to the one or more user actions performed by one or more users 102, in the one or more video contents.

The plurality of subsystems 108 further includes the feedback obtaining subsystem 208 that is communicatively connected to the one or more hardware processor(s) 218. The feedback obtaining subsystem 208 is configured to obtain the one or more feedbacks from the one or more user devices 104 of the one or more users 102 on at least one of: the one or more animated media contents and the second one or more video contents played corresponding to the one or more user actions performed by the one or more users 102.

In an embodiment, the one or more feedbacks obtained from the one or more user devices 104 of the one or more users 102 includes at least one of: one or more ratings (i.e., an explicit feedback) provided through the one or more user devices 104, and one or more face expressions (i.e., an implicit feedback) provided by the one or more users 102. In another embodiment, the one or more face expressions are provided by the one or more users 102 through one or more image capturing devices of the one or more user devices 104. In an embodiment, the one or more image capturing devices may include at least one of: a camera, a digital scanner, and the like.

The plurality of subsystems 108 further includes the score generation subsystem 210 that is communicatively connected to the one or more hardware processor(s) 218. The score generation subsystem 210 is configured to generate the score for the machine learning model based on the one or more feedbacks obtained from the one or more user devices 104 of the one or more users 102 on at least one of: the one or more animated media contents and the second one or more video contents.

In an embodiment, the machine learning model is configured to provide at least one of: the one or more animated media contents and the second one or more video contents to be played corresponding to the one or more user actions performed by the one or more users 102, in the one or more video contents.

In an embodiment, the machine learning model is trained by (a) analyzing the score generated for the machine learning model, (b) determining whether the score generated for the machine learning model exceeds a predetermined threshold value, and (c) training the machine learning model to generate the second one or more animated media contents and third one or more video contents, to be played with the one or more video contents associated with the one or more digital interactive platforms, when the score generated for the machine learning model is within the predetermined threshold value.

In an embodiment, the score generated for the machine learning model is within the predetermined threshold value when at least one of: the one or more animated media contents and the second one or more video contents corresponding to the one or more user actions performed by the one or more users 102, is played repetitively in a predefined time period. In an embodiment, the machine learning model may include at least one of: a linear regression model, a decision tree model, and random forest model, and the like.

The plurality of subsystems 108 further includes the media content generating subsystem 212 that is communicatively connected to the one or more hardware processor(s) 218. The media content generating subsystem 212 is configured to generate the second one or more animated media contents and the third one or more video contents, to be played with the one or more video contents associated with the one or more digital interactive platforms based on the score generated for the machine learning model, to optimize the user experience in the one or more digital interactive platforms. In an embodiment, the second one or more animated media contents and the third one or more video contents, are different from the one or more animated media contents and second one or more video contents.

Figure 3:
FIG. 3 is an overall process flow for generating the score for the machine learning model to optimize the user experience in the one or more digital interactive platforms, such as those shown in FIG. 1, in accordance with an embodiment of the present disclosure.
Figure 3:
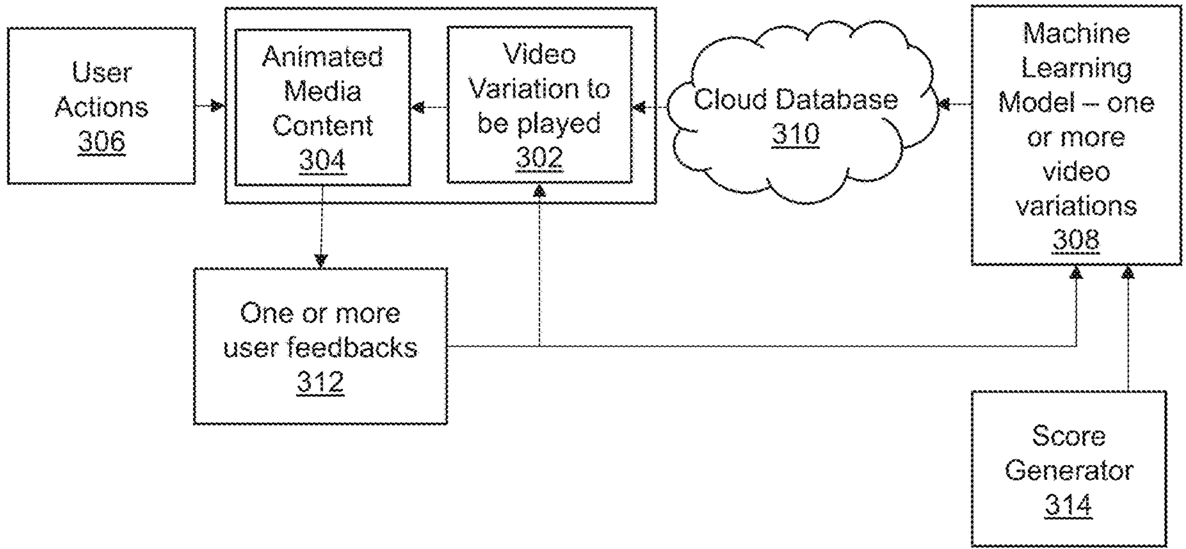

FIG. 3 is an overall process flow 300 for generating the score for the machine learning model to optimize the user experience in the one or more digital interactive platforms, such as those shown in FIG. 1, in accordance with an embodiment of the present disclosure.

The one or more video variations to be played dynamically corresponding to the one or more user actions (shown in step 306) performed by the one or more users 102, in the one or more video contents, is selected, as shown in step 302.

In an embodiment, the one or more video variations is played as at least one of: the one or more animated media contents and the second one or more video contents to be played with the one or more video contents, as shown in step 304.

At least one of: the one or more animated media contents and the second one or more video contents to be played corresponding to the one or more user actions performed by the one or more users 102, in the one or more video contents, is provided by the machine learning model, as shown in step 308.

In an embodiment, the one or more video variations (i.e., the one or more animated media contents and the second one or more video contents) to be played with the one or more video contents, are pre-stored in a cloud database, as shown in step 310.

The one or more feedbacks is obtained from the one or more user devices 104 of the one or more users 102 on at least one of: the one or more animated media contents and the second one or more video contents played corresponding to the one or more user actions performed by the one or more users 102, as shown in step 312.

The score is generated for the machine learning model based on the one or more feedbacks obtained from the one or more user devices 104 of the one or more users 102 on at least one of: the one or more animated media contents and the second one or more video contents, as shown in step 314. In an embodiment, the second one or more animated media contents and third one or more video contents, to be played with the one or more video contents associated with the one or more digital interactive platforms, is generated based on the score generated for the machine learning model, to optimize the user experience in the one or more digital interactive platforms.

FIG. 4 is a flow chart depicting a computer-implemented method 400 for generating the score for the machine learning model to optimize the user experience in the one or more digital interactive platforms, in accordance with an embodiment of the present disclosure.

At step 402, the one or more video contents associated with the one or more digital interactive platforms is generated.

At step 404, at least one of: the one or more animated media contents and the second one or more video contents to be played dynamically corresponding to one or more user actions performed by one or more users 102, in the one or more video contents, is selected.

At step 406, the one or more feedbacks is obtained from the one or more user devices 104 of the one or more users 102 on at least one of: the one or more animated media contents and the second one or more video contents played corresponding to the one or more user actions performed by the one or more users 102.

At step 408, the score for the machine learning model is generated based on the one or more feedbacks obtained from the one or more user devices 104 of the one or more users 102 on at least one of: the one or more animated media contents and the second one or more video contents. In an embodiment, the machine learning model is configured to provide at least one of: the one or more animated media contents and the second one or more video contents to be played corresponding to the one or more user actions performed by the one or more users 102, in the one or more video contents.

At step 410, the second one or more animated media contents and the third one or more video contents, to be played with the one or more video contents associated with the one or more digital interactive platforms, is generated based on the score generated for the machine learning model, to optimize the user experience in the one or more digital interactive platforms.

The present invention has following advantages. The present invention is configured to optimize the user experience in the one or more digital interactive platforms by generating the score for the machine learning model based on the one or more feedbacks of the one or more users 102 on the one or more video variations played with the one or more video contents.

The present invention with the computer-implemented system 106 is configured to encourage the machine learning model (i.e., by providing scores) to provide variety of the one or more video variations to be played with the one or more video contents associated with the one or more digital interactive platforms based on the one or more feedbacks from the one or more users 102, in order to maximize the user experience in the one or more digital interactive platforms.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, an apparatus, or a device.

The medium can be an electronic, a magnetic, an optical, an electromagnetic, an infrared, or a semiconductor system (or an apparatus or a device) or a propagation medium. Examples of a computer-readable medium include a semiconductor or solid-state memory, a magnetic tape, a removable computer diskette, a random-access memory (RAM), a read-only memory (ROM), a rigid magnetic disk and an optical disk. Current examples of optical disks include a compact disk-read only memory (CD-ROM), a compact disk-read/write (CD-R/W) and a DVD.

Input/output (I/O) devices (including but not limited to keyboards, displays, pointing devices, and the like.) can be coupled to the computer-implemented system 106 either directly or through intervening I/O controllers. Network adapters may also be coupled to the computer-implemented system 106 to enable a data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer-implemented system 106 in accordance with the embodiments herein. The computer-implemented system 106 herein comprises at least one of: a processor or a central processing unit (CPU). The CPUs are interconnected via the system bus 214 to various devices such as a random-access memory (RAM), read-only memory (ROM), and an input/output (I/O) adapter. The I/O adapter can connect to peripheral devices, such as disk units and tape drives, or other program storage devices that are readable by the computer-implemented system 106. The computer-implemented system 106 can read the inventive instructions on the program storage devices and follow these instructions to execute the methodology of the embodiments herein.

The computer-implemented system 106 further includes a user interface adapter that connects a keyboard, a mouse, a speaker, a microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, a printer, or a transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like. Of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. A computer-implemented system for generating a score for a machine learning (ML) model to optimize a user experience in one or more digital interactive platforms, the computer-implemented system comprising:

one or more hardware processors; and a memory coupled to the one or more hardware processors, wherein the memory comprises a set of program instructions in form of a plurality of subsystems, configured to be executed by the one or more hardware processors, wherein the plurality of subsystems comprises:

a video content generating subsystem configured to generate one or more video contents associated with the one or more digital interactive platforms;

a media content selection subsystem configured to select at least one of:

one or more animated media contents, the animated media contents comprising one or more video variations distinct from the one or more video contents generated by the video content generating subsystem, and a second set of one or more video contents distinct from the one or more video contents generated by the video content generating subsystem and distinct from the animated media contents, wherein the one or more animated media contents and the second set of one or more video contents are configured to be played dynamically corresponding to one or more user actions performed by one or more users, during playback of the one or more video contents;

a feedback obtaining subsystem configured to obtain one or more feedbacks from one or more user devices of the one or more users on at least one of: the one or more animated media contents and the second set of one or more video contents played corresponding to the one or more user actions performed by the one or more users;

a score generation subsystem configured to generate the score for the machine learning model based on the one or more feedbacks obtained from the one or more user devices of the one or more users on at least one of: the one or more animated media contents and the second set of one or more video contents, wherein the machine learning model is configured to provide at least one of: the one or more animated media contents and the second set of one or more video contents to be played corresponding to the one or more user actions performed by the one or more users, during playback of the one or more video contents; and a media content generating subsystem configured to generate second one or more animated media contents and third one or more video contents, to be played with the one or more video contents associated with the one or more digital interactive platforms based on the score generated for the machine learning model, to optimize the user experience in the one or more digital interactive platforms.

2. The computer-implemented system as claimed in claim 1, wherein the machine learning model is trained by:

analyzing the score generated for the machine learning model, wherein the score is generated for the machine learning model based on the one or more feedbacks obtained from the one or more user devices of the one or more users on at least one of: the one or more animated media contents and the second set of one or more video contents;

determining whether the score generated for the machine learning model exceeds a predetermined threshold value; and training the machine learning model to generate the second one or more animated media contents and third one or more video contents, to be played with the one or more video contents associated with the one or more digital interactive platforms, when the score generated for the machine learning model is within the predetermined threshold value.

3. The computer-implemented system as claimed in claim 2, wherein the score generated for the machine learning model is within the predetermined threshold value when at least one of: the one or more animated media contents and the second set of one or more video contents corresponding to the one or more user actions performed by the one or more users, is played repetitively in a predefined time period.

4. The computer-implemented system as claimed in claim 1, wherein the one or more feedbacks obtained from the one or more user devices of the one or more users comprises at least one of: one or more ratings provided through the one or more user devices, and one or more face expressions provided by the one or more users.

5. The computer-implemented system as claimed in claim 4, wherein the one or more face expressions are provided by the one or more users through one or more image capturing devices of the one or more user devices.

6. A computer-implemented method for generating a score for a machine learning (ML) model to optimize a user experience in one or more digital interactive platforms, the computer-implemented method comprising:

generating, by one or more hardware processors, one or more video contents associated with the one or more digital interactive platforms;

selecting, by the one or more hardware processors, at least one of:

one or more animated media contents, the animated media contents comprising one or more video variations distinct from the one or more video contents, and a second set of one or more video contents distinct from the one or more video contents and distinct from the animated media contents, wherein the one or more animated media contents and the second set of one or more video contents are configured to be played dynamically corresponding to one or more user actions performed by one or more users, during playback of the one or more video contents;

obtaining, by the one or more hardware processors, one or more feedbacks from one or more user devices of the one or more users on at least one of: the one or more animated media contents and the second set of one or more video contents played corresponding to the one or more user actions performed by the one or more users;

generating, by the one or more hardware processors, the score for the machine learning model based on the one or more feedbacks obtained from the one or more user devices of the one or more users on at least one of: the one or more animated media contents and the second set of one or more video contents, wherein the machine learning model is configured to provide at least one of: the one or more animated media contents and the second set of one or more video contents to be played corresponding to the one or more user actions performed by the one or more users, during playback of the one or more video contents; and generating, by the one or more hardware processors, second one or more animated media contents and third one or more video contents, to be played with the one or more video contents associated with the one or more digital interactive platforms based on the score generated for the machine learning model, to optimize the user experience in the one or more digital interactive platforms.

7. The computer-implemented method as claimed in claim 6, wherein the machine learning model is trained by:

analyzing, by the one or more hardware processors, the score generated for the machine learning model, wherein the score is generated for the machine learning model based on the one or more feedbacks obtained from the one or more user devices of the one or more users on at least one of: the one or more animated media contents and the second one or more video contents;

determining, by the one or more hardware processors, whether the score generated for the machine learning model exceeds a predetermined threshold value; and training, by the one or more hardware processors, the machine learning model to generate the second one or more animated media contents and third one or more video contents, to be played with the one or more video contents associated with the one or more digital interactive platforms, when the score generated for the machine learning model is within the predetermined threshold value.

8. The computer-implemented method as claimed in claim 7, wherein the score generated for the machine learning model is within the predetermined threshold value when at least one of: the one or more animated media contents and the second one or more video contents corresponding to the one or more user actions performed by the one or more users, is played repetitively in a predefined time period.

9. The computer-implemented method as claimed in claim 6, wherein the one or more feedbacks obtained from the one or more user devices of the one or more users comprises at least one of: one or more ratings provided through the one or more user devices, and one or more face expressions provided by the one or more users.

10. The computer-implemented method as claimed in claim 9, wherein the one or more face expressions are provided by the one or more users through one or more image capturing devices of the one or more user devices.

* * * * *